(12) United States Patent
Mantyla et al.

(10) Patent No.: US 10,279,284 B2
(45) Date of Patent: May 7, 2019

(54) WASTE WATER SEPARATION VESSEL

(71) Applicant: CANPLAS INDUSTRIES, LTD., Barrie, Ontario (CA)

(72) Inventors: James Mantyla, Barrie (CA); Andrew Neil Bird, Shanty Bay (CA); Timothy James Poupore, Toronto (CA); Steve Armstrong, Toronto (CA)

(73) Assignee: CANPLAS INDUSTRIES LTD., Barrie, Ontario ( * ) Notice: Subject to any disclaimer, the term of this patent is extended or adjusted under 35 U.S.C. 154(b) by 271 days.

(21) Appl. No.: 15/259,129

(22) Filed: Sep. 8, 2016

(65) Prior Publication Data

US 2017/0072340 A1    Mar. 16, 2017

(30) Foreign Application Priority Data

Sep. 10, 2015 (CA) ..................... 2903838

(51) Int. Cl.
| | |
|---|---|
| *B01D 21/02* | (2006.01) |
| *B01D 21/00* | (2006.01) |
| *B01D 21/24* | (2006.01) |
| *C02F 1/40* | (2006.01) |
| *C02F 103/32* | (2006.01) |

(52) U.S. Cl.
CPC ..... *B01D 21/2483* (2013.01); *B01D 21/0003* (2013.01); *B01D 21/0006* (2013.01); *B01D 21/0018* (2013.01); *B01D 21/0042* (2013.01); *B01D 21/02* (2013.01); *B01D 21/2444* (2013.01); *C02F 1/40* (2013.01); *C02F 2103/32* (2013.01)

(58) Field of Classification Search
None
See application file for complete search history.

(56) References Cited

U.S. PATENT DOCUMENTS

| | | | |
|---|---|---|---|
| 1,889,601 A  * | 11/1932 | Heinkel | B01D 21/0087 210/532.1 |
| 4,145,287 A | 3/1979 | Walker et al. | |
| 7,011,752 B2 | 3/2006 | Broeders et al. | |
| 7,300,588 B2 | 11/2007 | Broeders et al. | |
| 7,427,356 B2 | 9/2008 | Chapin | |
| 7,481,321 B2 | 1/2009 | Ismert | |
| 7,641,805 B2 | 1/2010 | Batten et al. | |
| 7,828,960 B1 | 11/2010 | Batten et al. | |
| 7,967,985 B1 | 6/2011 | Parjus et al. | |

(Continued)

*Primary Examiner* — Ana M Fortuna
(74) *Attorney, Agent, or Firm* — Budzyn IP Law, LLC

(57) ABSTRACT

A waste water separation vessel is provided having a wedge shaped body with an internal water containing volume. The body is configured to trap FOG and wastes within the body allowing water to pass through the body. At least one top facing access port to allow access to the internal volume of the body is provided and the wedge shaped body tapers outwardly from top to bottom to define a larger bottom area than a top area. The side walls include vertically oriented strengthening ribs which define intervening indentations, and each lower end of the vertically oriented ribs is connected to a generally horizontal beam which defines closed bottom ends on the indentations. When the vessel is buried in the ground the wedge shaped body and the closed bottom indentations interact with the ground to help oppose any buoyancy forces acting on the buried body.

29 Claims, 7 Drawing Sheets

(56) References Cited

U.S. PATENT DOCUMENTS

| | | |
|---|---|---|
| 7,997,156 B1 | 8/2011 | Batten et al. |
| 8,153,004 B2 | 4/2012 | Rodriguez-Jovert |
| 8,252,188 B1 | 8/2012 | Batten et al. |
| 9,932,247 B1* | 4/2018 | Batten ..................... C02F 1/40 |
| 2009/0109057 A1* | 4/2009 | Lenger ..................... H04Q 9/00 |
| | | 340/870.07 |
| 2013/0221545 A1* | 8/2013 | Bird ..................... B01D 17/045 |
| | | 261/3 |
| 2014/0150877 A1 | 6/2014 | Batten et al. |
| 2015/0122728 A1* | 5/2015 | Whiteside ................ E03F 5/16 |
| | | 210/519 |
| 2016/0101374 A1* | 4/2016 | Bird .................. B01D 17/0208 |
| | | 137/15.05 |

* cited by examiner

WASTE WATER SEPARATION VESSEL

FIELD OF THE INVENTION

This invention relates generally to the field of waste water treatment and more specifically to the treatment of waste water emanating from food service establishments. Most particularly this invention relates to methods and apparatuses for separating heavier than water solids and lighter than water Fats Oils and Greases (FOG) from the waste water system before the waste water system is connected to the municipal sanitary sewer system. Such devices may be called grease traps, interceptors, or waste water separators.

BACKGROUND OF THE INVENTION

In commercial food preparation facilities, such as commercial kitchens and restaurants, the sink can be a major source of water borne food waste. In the course of normal food preparation, food wastes comprising FOG and/or food solids may be inadvertently or intentionally introduced to the waste water drainage system and, in other cases, a mechanical chopper such as a garborator is used to shred the food waste as it leaves the sink and enters the waste water system. Many food preparation establishments, such as commercial restaurants and the like, have multiple sinks for such food waste disposal.

The direct disposal into the sanitary sewer system of FOG and FOG laden debris from commercial food preparation facilities is problematic. There are a number of reasons why this is so, including the tendency for such materials to clog or plug sanitary sewage systems and the difficulty of adequately treating and digesting such materials in a sewage treatment facility. Therefore, many jurisdictions require that these materials be removed from the waste water stream before permitting the waste water stream to be added to the sanitary sewer system. Such removed materials may then be separately disposed of, for example, at solid land fill sites.

Devices known as waste water separators or grease interceptors have been developed to carry out the separation of such food borne wastes from the waste water. These waste water separators are connected to the waste water effluent stream from the food preparation facility and are integrated into the building drain line before the drain line reaches the municipal sanitary sewer system. The interceptor may commonly be located internally within the kitchen or externally adjacent to the building. The grease interceptors may take a number of forms, but typically consist of an in-line container which is mounted on, at or below grade within the waste water discharge system downstream of all of the discharging sinks, appliances and the like. The container typically includes features that are configured to trap FOG which may, for example, float to the surface of the container and trap solids which may sink, while permitting separated or clarified water to pass through to the sewer system. Once enough of the trapped waste FOG and solids have accumulated in the container, the wastes can be physically removed in a periodic pump out or servicing step. The container may also contain features to collect solids for disposal. In this way these wastes are conveniently and continuously removed from the waste water before the waste water enters the sanitary sewer system. While good in theory, in practice such systems pose many challenges. The smell from the trapped wastes can be overwhelming, when the separator is opened for servicing. Having individual pump out trucks to provide periodic service can be expensive as there is a charge associated with each visit.

One identified need is to provide a high efficiency separator using a compact footprint. Secondarily, qualified separation based on independent third party validation can offer comparable operation in respect of maintenance frequency but enhanced separation performance based on hydromechanical features. In some cases such devices may or need to be located outside of the building envelop, saving on internal space and making the servicing access easier. As well, by locating the separators outside of the building footprint, having the unpleasant odours associated with the devices being serviced and pumped out inside the kitchen can be avoided—thereby avoiding having bad smells permeate the interior of the food service establishment. This increases the window of time when servicing can occur as it does not have to wait until the food service establishment is otherwise closed to avoid the bad smells being released inside the premises.

However, locating the separators outside of the building footprint has some issues. For example, waste water drainage lines operate by gravity drainage. Most municipal building codes prescribe a minimum slope for the waste water drainage conduits to ensure the free flow of water waste through the drainage system. Therefore the further from the source of the fluid, such as a sink, the lower in the ground the drain line is likely to be and the deeper the separator has to be buried. Thus often, if the waste water separator is to be located outside of the building footprint, it must be buried a certain amount below the surface grade, and the further away it is the deeper it must be buried, due to the fall in the buried waste water pipe. As well in regions that have ground freezing the waste water pipes will typically need to be buried below the frost line to prevent them from freezing.

Buried vessels must be able to resist the loads that are applied to the vessel during their normal everyday use. In the past such buried vessels have been made out of reinforced concrete structures or epoxy-coated metals which can be used to form rigid containment vessels. Now, it is preferred to use more cost efficient materials and manufacturing methods, such as plastic molding techniques, to reduce the cost of making, transporting and installing such underground vessels. Any such plastic molded vessels need to be strong enough to resisting normal sub grade loading patterns. There are two loading extremes. The first is when the vessel is full of waste water. Fortunately, in this case the load of the water pressing on the side walls may be passed into the soil adjacent to the exterior of the vessel. Thus, in addition to the inherent strength of walls of the vessel there is some load support from the surrounding soil. The other loading extreme comes when the vessel is empty, for example when it is being serviced and the FOG and solid wastes are being pumped out, but there is, for example, a high water table or ground water level on the outside of the vessel. In that case rather than having pressure directed outwardly and supported by the surrounding surface, the pressure is directed upwardly and inwardly on the hollow vessel. Further, depending upon how close to the surface the water table or ground water level is, there may be large upward buoyancy forces generated which will try to push the hollow vessel up out of the ground. Unrestrained movement of the vessel under the influence of such lifting forces can cause misalignment of the fluid connections with the drain lines leading into and out of the vessel leading to leaks and unacceptable ground water contamination.

One prior art design for a large flow through waste water separator is found in U.S. Pat. No. 7,481,321 entitled Interceptor for Separating a Mixture which issued Jan. 27, 2009. In FIGS. 8 and 9 a large throughput volume design is shown which can accommodate flow rates of between 10 gallons per minute and 100 gallons per minute. The device includes top openings to facilitate clean out. The body appears to be narrow at the top, wider at the middle and tapers towards a bottom. Built in lifting handles are provided. U.S. Pat. No. 7,011,752 entitled Waste Water Separator and Method of Using the Same issued on Mar. 14, 2006 and teaches a separator with a ramp molded into the floor to direct the water flow through the body in a diagonal manner to facilitate separation of the FOG. Neither of these prior patents addresses the load bearing problems associated with the buoyancy forces that can arise upon a clean out of a buried vessel where the vessel is buried below the top of the water table. Other prior waste water separator patents include:

U.S. Pat. No. 4,145,287
U.S. Pat. No. 7,011,752
U.S. Pat. No. 7,300,588
U.S. Pat. No. 7,427,356
U.S. Pat. No. 7,481,321
U.S. Pat. No. 7,641,805
U.S. Pat. No. 7,828,960
U.S. Pat. No. 7,967,985
U.S. Pat. No. 7,997,156
U.S. Pat. No. 8,153,004
U.S. Pat. No. 8,252,188
United States Publication No. US2014/0150877

SUMMARY OF THE INVENTION

The present invention is directed to an interceptor for the separation of non-petroleum fats, oil and grease from a flow of waste water, the interceptor having a body which may naturally resist the buoyancy forces that can arise on a vessel that is buried below grade level and which must be pumped out and cleaned according to a service schedule at regular intervals. The body may be wedge shaped with a narrower top and a wider bottom with a taper extending between the top and the bottom. With a wedge shaped body the soil located vertically above the wider portion of the tapered body, can weigh on the body to resist the buoyancy forces created, for example, by a high or elevated water table. The present invention may also provide generally vertical outwardly arched reinforcing ribs on the body which are separated by vertically oriented indentations. The generally vertical ribs may be joined to a horizontal rib along the lower extent of the vessel. In this way the ribs and indentations may interact with the surrounding soil to provide further resistance to any buoyancy lift on said body. The vertical and horizontal ribs may be outwardly formed, such as by being arched, to improve lateral soil bearing capacity and increased strength.

The body of the present invention may also be provided with molded in features to facilitate and manage the separation of the solids and FOG from the waste water and may include a central waste collection area or floor portion which is lower that the surrounding floor portions. The floor may be positively sloped downwardly towards a collection area to encourage collecting solids waste in the collection area for ease of removal. The body may also be provided with at least one pump out port, which can be opened during servicing or maintenance of the interceptor, having for example a flexible elastomeric flange to locate and seal against a transfer pipe which may be independently extended from a vacuum maintenance vehicle into the interceptor. The pump out opening can be preferably located to permit easy access to the collection area, such as by being positioned directly above the waste collection area to facilitate the suction removal of the wastes during pump out and servicing.

The body may also preferably include features to balance hydrodynamic and air pressures which may occur under the extremes of waste water discharge. Balancing within the interceptor both laterally and longitudinally may preferably be managed by the internal profile of the vessel but also by features allowing for free transfer and exchange of air between the upper aspects, a separation zone within the vessel and an air space between the contents of the tank and the upper internal confines of the vessel.

Therefore according to the present invention there is provided a waste water separation vessel comprising:

a wedge shaped hollow body having a top wall, side walls and end walls extending down from the top wall and a bottom connected to said side walls and end walls to define an internal water containing volume, said body being configured to trap FOG and wastes within said body but to allow water to pass through said body, an inlet and an outlet on said body to permit said waste water to flow into and then out of said body, and at least one top facing access port to allow access to said internal volume of said body, wherein said wedge shaped body tapers outwardly from the top to the bottom to define a larger bottom area than a top area, and said side walls include vertically oriented strengthening ribs which define intervening indentations, and a lower end of said vertically oriented ribs is connected to a generally horizontal beam which defines closed bottom ends on said indentations, wherein when said vessel is buried in the ground said wedge shaped body and said closed bottom indentations interact with said ground to help oppose any buoyancy forces acting on said buried body.

In a preferred embodiment these elements may be positioned to closely adjoin with lateral or longitudinal air transfer details to promote the free movement of air evenly throughout the space between the solid or liquid content and the uppermost internal confines of the vessel.

BRIEF DESCRIPTION OF THE DRAWINGS

Reference will now be made, by way of example only, to preferred embodiments of the invention by reference to the following drawings in which:

FIG. 6A is an enlarged view of a portion of FIG. 6; and

DETAILED DESCRIPTION OF THE PREFERRED EMBODIMENTS

Figure 1:
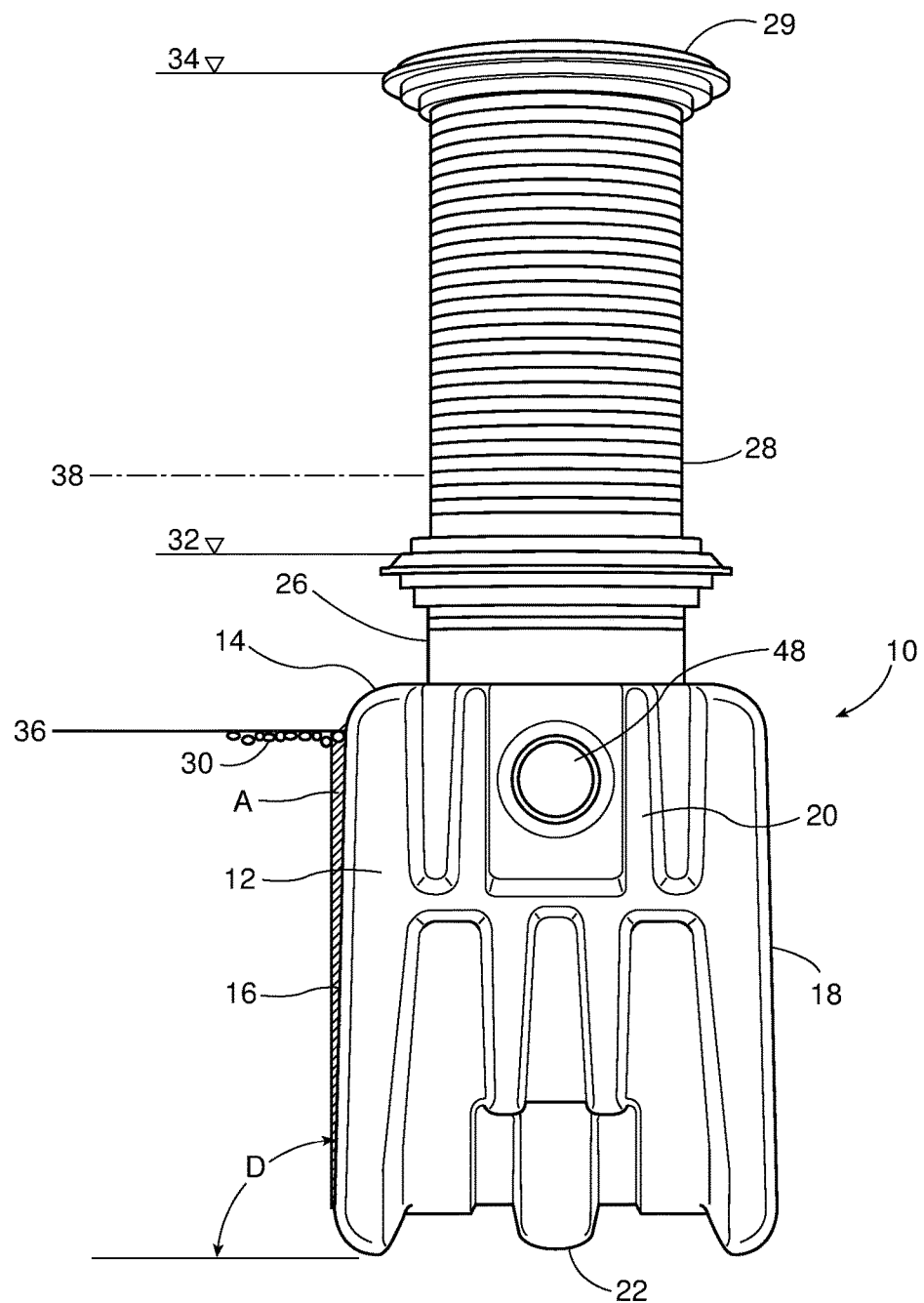
FIG. 1 is an end view of the vessel of FIG. 1 shown buried underground.

FIG. 1 shows a separator vessel according to a preferred aspect of the present invention which is generally noted as 10. The vessel includes, in cross section, a wedge shaped body 12 having a top wall 14, side walls 16 and 18, and end wall 20 and a bottom 22. The top walls and bottom are integrally molded to form an internal water containing volume within the body 12. The vessel 10 may be equipped with internal features to trap FOG and solids wastes, and to allow the passage of separated water out to the sanitary sewer system. Thus the body 12 has at least one outlet 24 which may be used to allow the vessel 10 to be connected to the municipal sewer system.

Formed into the top wall 14 is an access opening defined by a riser 26 which can, for example, be molded in such a way so that it can be cut to height as needed for a specific installation. Also shown is a riser stack 28 which is sized and shaped to be mounted on the riser 26 of the vessel 10. Said risers may be integrated to the tank or independently formed and are to provide access to the interior of the vessel 10 even when the vessel 10 is buried below a ground surface as explained in more detail below. The riser stack 28 can be cut to specifically desired length during installation. A cover 29 can be used to close the top opening of the riser stack 28.

As can be seen from FIG. 1, the vessel 10 may be in the form of a tapered body 12 with the bottom 22 having a greater lateral dimension than the top wall 14. Although a range of tapers are contemplated by the present invention it has been found that a 3 degree draft angle D provides adequate results. A larger taper may be provided in some cases, but the larger the taper angle the greater the vertical soil load on the side walls of the vessel. A narrower taper angle can also be used, but the narrower taper angle creates less interference against the buoyancy forces that might be generated underneath the vessel under certain operating conditions. Therefore it is preferred to use the 3 degree taper angle as noted above. The present invention comprehends a range of tapers though, from about 1 to 5 degrees with 3 degrees being the most preferred in this embodiment.

As will be understood, the preferred installation of the present invention is as a buried vessel in which it is closely surrounded by soil. As shown the soil 30 is placed around the vessel 10 and by reason of the taper angle a portion of the surrounding soil A sits above and weighs down on the sides of the vessel 10. This soil weight can help resist buoyancy forces which can arise from a high level of ground water or the like. Two levels of soil 32 and 34 are shown by way of example to represent different burying depths for the vessel 10, and two levels of ground water are also shown again by way of example only, at 36 and 38 to represent two different levels of the ground water relative to the soil surface, under different conditions. As will be understood by those skilled in the art, the height of the water table relative to the ground surface will vary with the season and with other related weather conditions.

Figure 2:
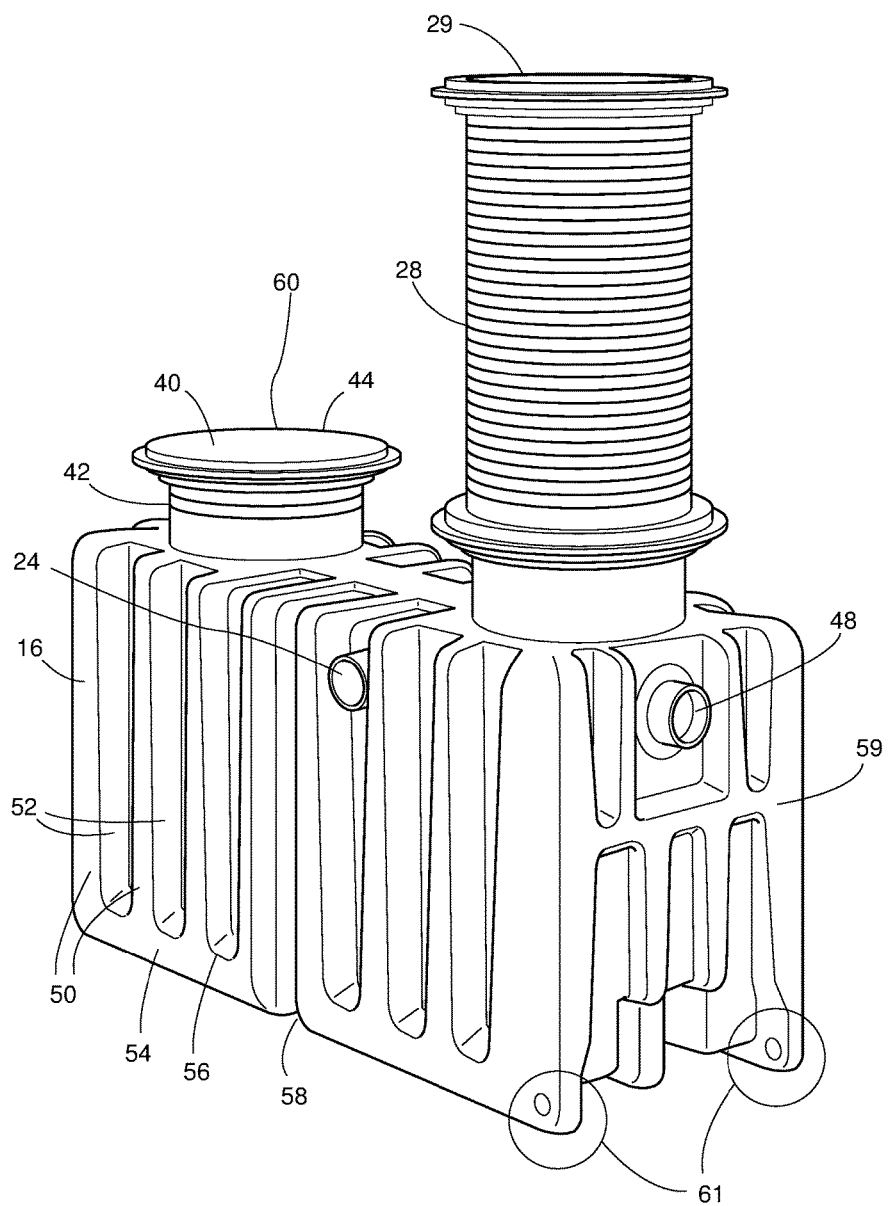
FIG. 2 is a perspective view of an outside of a waste water separator vessel according to a preferred embodiment of the present invention.

FIG. 2 shows the vessel 10 of FIG. 1 from above and to one side. In this embodiment a second access port is shown at 40, with a second riser 42. Typically, in use, this second access port would be installed in a comparable fashion to riser 28 with a cover 44 as shown. This cover(s) will preferably be located at grade level to maintain access for inspection and servicing. The advantage of having two such access ports is that the vessel 10 is easier to service and each access port can have its own riser stack which is height adjustable to permit it to be positioned independent of the height needed for the other stack riser, for example where the surface grade slopes between the stack locations.

FIG. 2 also shows the primary flow outlet 48 to allow the clarified water to flow out of the vessel 10. Illustrated in this view is at least one further side outlet 24 present and connected in a perpendicular orientation to primary outlet 48 and penetrating the side wall of the vessel. In a preferred embodiment and referencing FIG. 5, a further outlet penetration 49 is provided an outlet being installed and connected directly opposite the penetration 24a in the opposite side wall to permit maximum flexibility in connecting the outlet flow to the municipal sewer system and in positioning the vessel 10 within the soil.

FIG. 2 also shows the side wall 16 of the vessel in some detail. In this view the side wall is shown having a number of generally vertical strengthening or reinforcing ribs 50, which define intervening indentations 52. At a lower end each vertical rib 50 is connected to a horizontal beam 54 which defines a closed bottom end 56 on the indentations 52. It can now be appreciated that as the soil is closely placed around the vessel when it is buried, the soil will fill the indentations 52 and act in part as a counterweight against any buoyancy forces that may be generated, for example, by a high water table under certain conditions. The vertical ribs 50, the indentations 52 and the beam 54 are all preferably outwardly rounded to provide better strength against lateral soil pressure for example. The ribs can also include a wedge shape, as shown in which they are wider at the bottom and taper to a more narrow portion towards the top to further engage the soil against upward buoyancy forces. The beam 54 may also have a break as shown at 58, for ease of molding.

It will now be appreciated that the vessel according to the present invention may be a plastic molded product which can be more quickly, accurately and economically produced in large numbers as compared to concrete or steel vaults or the like of the prior art. However, being made from plastic means certain features are preferred to be incorporated into the vessel such as the vertical strengthening ribs, the rounded surfaces to better resist lateral and compressive soil pressures and the tapered body, allowing the light weight vessel to resist buoyancy forces, among other things. The vessel further preferably incorporates lateral through holes 61 at, for example, a lower outboard extremes to provide an integrated means for the tank to be secured by external mechanical means. These means can be categorized as ground anchors or pre-poured concrete anchor details used in conjunction for example with a coated stainless steel tether cable or similar connector. The preferred tank embodiment is considered based on types of plastics that are compatible with ground water and with food service waste water and meet the required codes for durability and environmental standards. This will as a minimum be a material with a specific gravity greater than 0.935 and is characterized most commonly as a polyolefin and its derivatives, Examples could be Medium Density Polyethylene (MDPE), High Density Polyethylene (HDPE) or Polypropylene. A preferred method of forming the vessel 10 is to use rotational molding, but other types of molding can also be used as will be understood by those skilled in the art.

Figure 3:
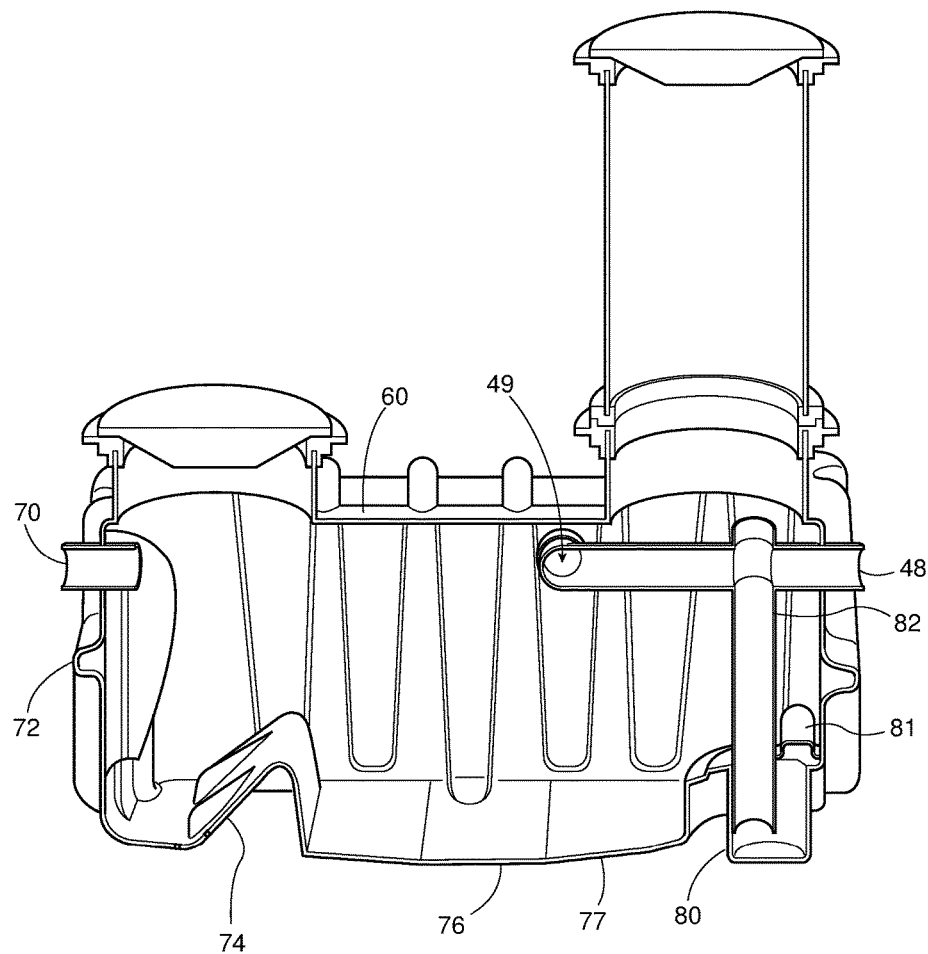
FIG. 3 is cross sectional view of the waste water separator vessel of FIG. 1.

FIG. 3 shows a cross section of the vessel embodiment of FIG. 2. In FIG. 3 the inlet 70 is shown with a dynamic inlet baffle assembly 72. This directs the incoming waste water down onto the ramp section 74. The ramp section 74 directs the waste water generally diagonally across the internal volume defined by the vessel to allow the FOG to separate out from the solids and the water. The solids will tend to collect in the central area by gravity deposition and are managed in doing so by means of a sloped floor pan shown at 76. Most preferable the sloped floor 77 is formed integrally as part of the bottom of the vessel 10. Beyond the sloped floor is a well 80 formed into the bottom of the vessel.

The well has a cover 81 which prevents solids and retained grease from passing into the well while at the same time allowing water to enter the well. The water can then flow up the stand pipe 82 and out one of the outlets 24, 48 (not shown in this view) and 49 according to how the vessel 10 is connected to the municipal sewer system. In this way the FOG will collect towards a top of the internal volume and the solids will collect at the bottom in the collection area towards a middle of the floor pan.

Figure 4:
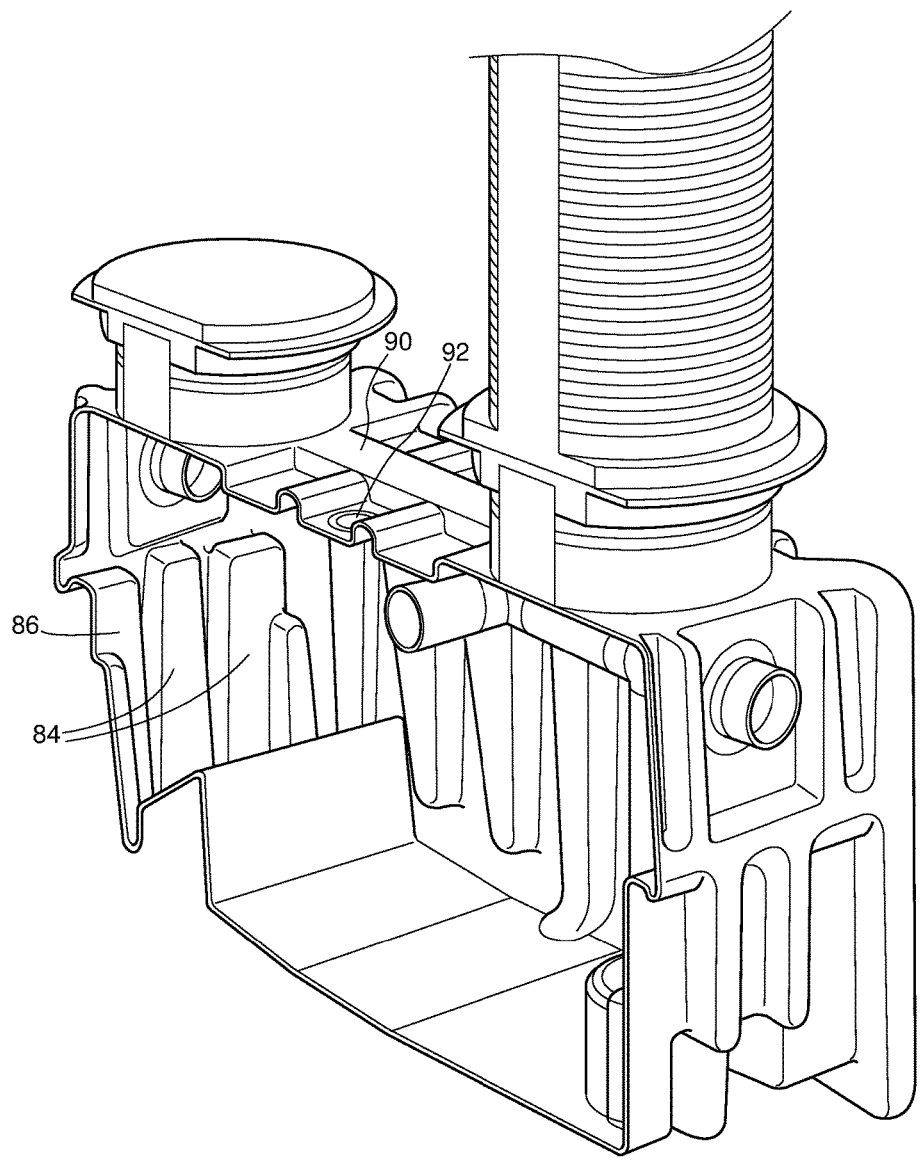
FIG. 4 is a view of the waste water separator of FIG. 2 from one end to show additional features within the vessel of FIG. 2.

FIG. 4 shows a different perspective of the cross sectional view of FIG. 3. In it the end wall details can be seen more clearly. As shown, the end wall also includes a series of generally vertical ribs 84 (which project outwardly) and define indentations 86 in between the ribs (when viewed from the outside). When viewed from the inside though the ribs define vertical flow channels which permit in flow into the vessel even when solids have accumulated so that the chamber is not readily open to smooth fluid flow. Thus the end wall ribs serve a dual function of providing a clog free flow path on the inside of the vessel for the waste water to enter into the internal volume of the vessel 10 as well as reinforcing structures on the outside of the vessel. FIG. 4 also shows an air balancing channel 90 oriented longitudinally along the top of vessel, preferably connecting with the lateral rib details and forming a network of channels to promote and maintain an even distribution of air. Also visible is a pump out access port 92 which is explained in more detail below.

Figure 5:
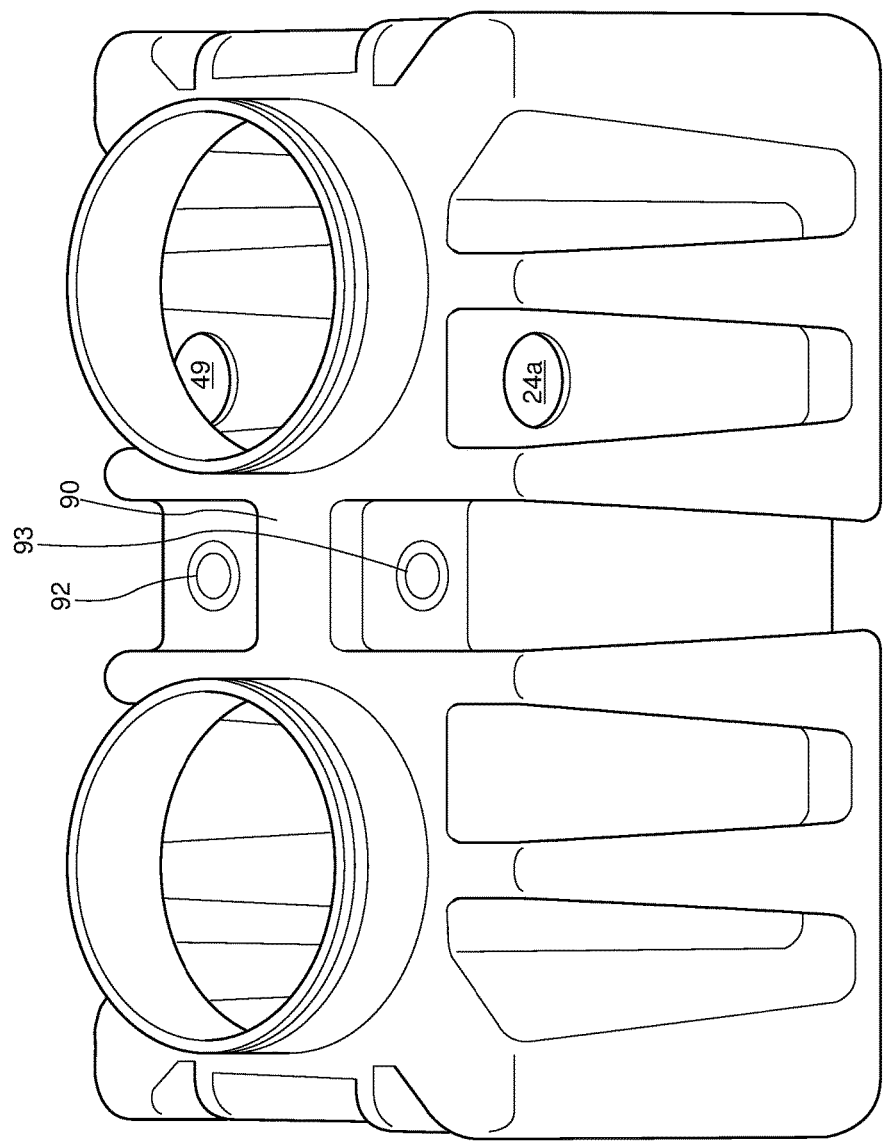
FIG. 5 is a perspective view from above and to one side of the waste water separator of FIG. 1.
Figure 6:
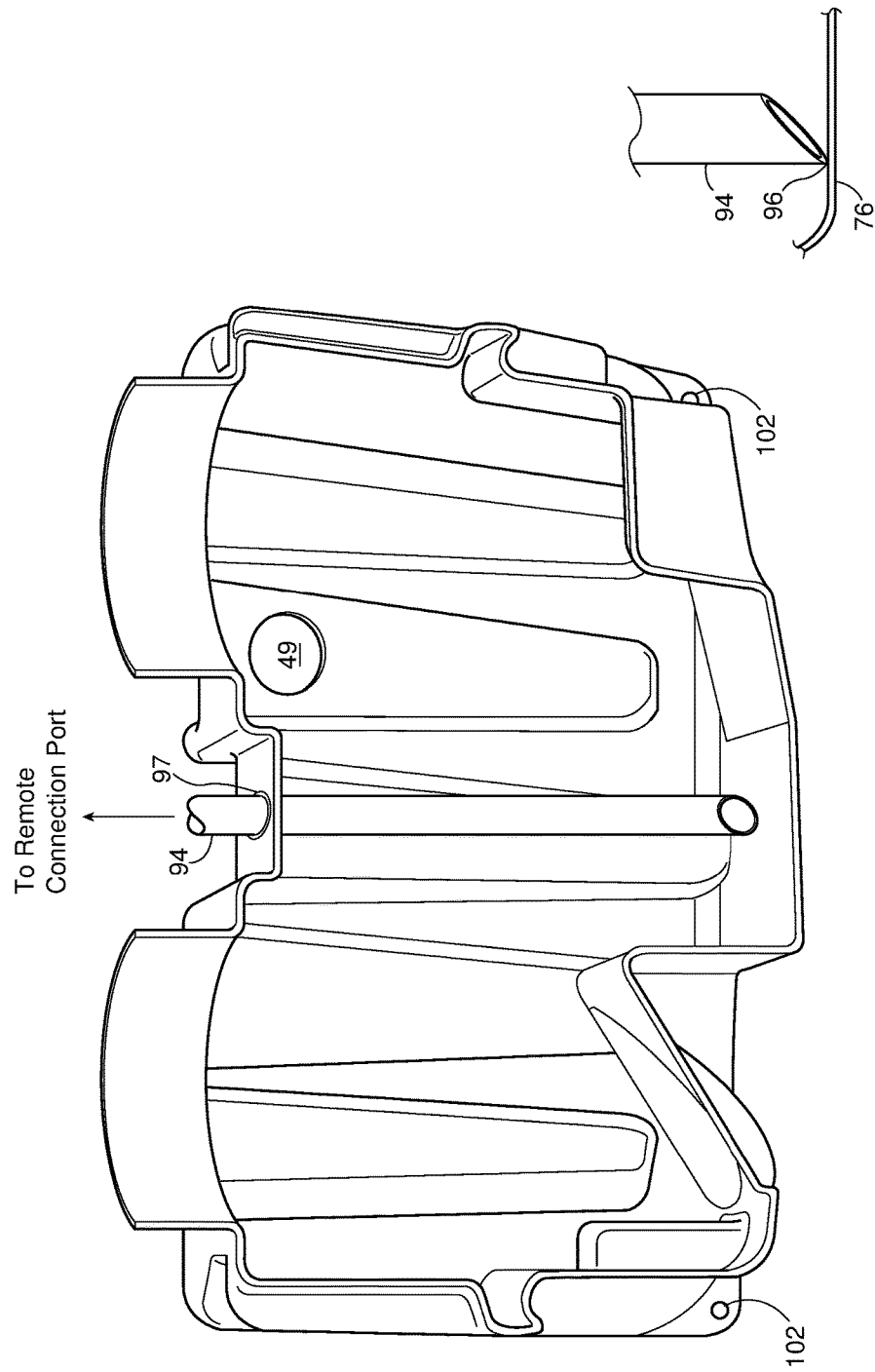
FIG. 6 is a cross sectional view of the vessel of FIG. 5 showing a pump out nozzle being used within the vessel.
Figure 7:
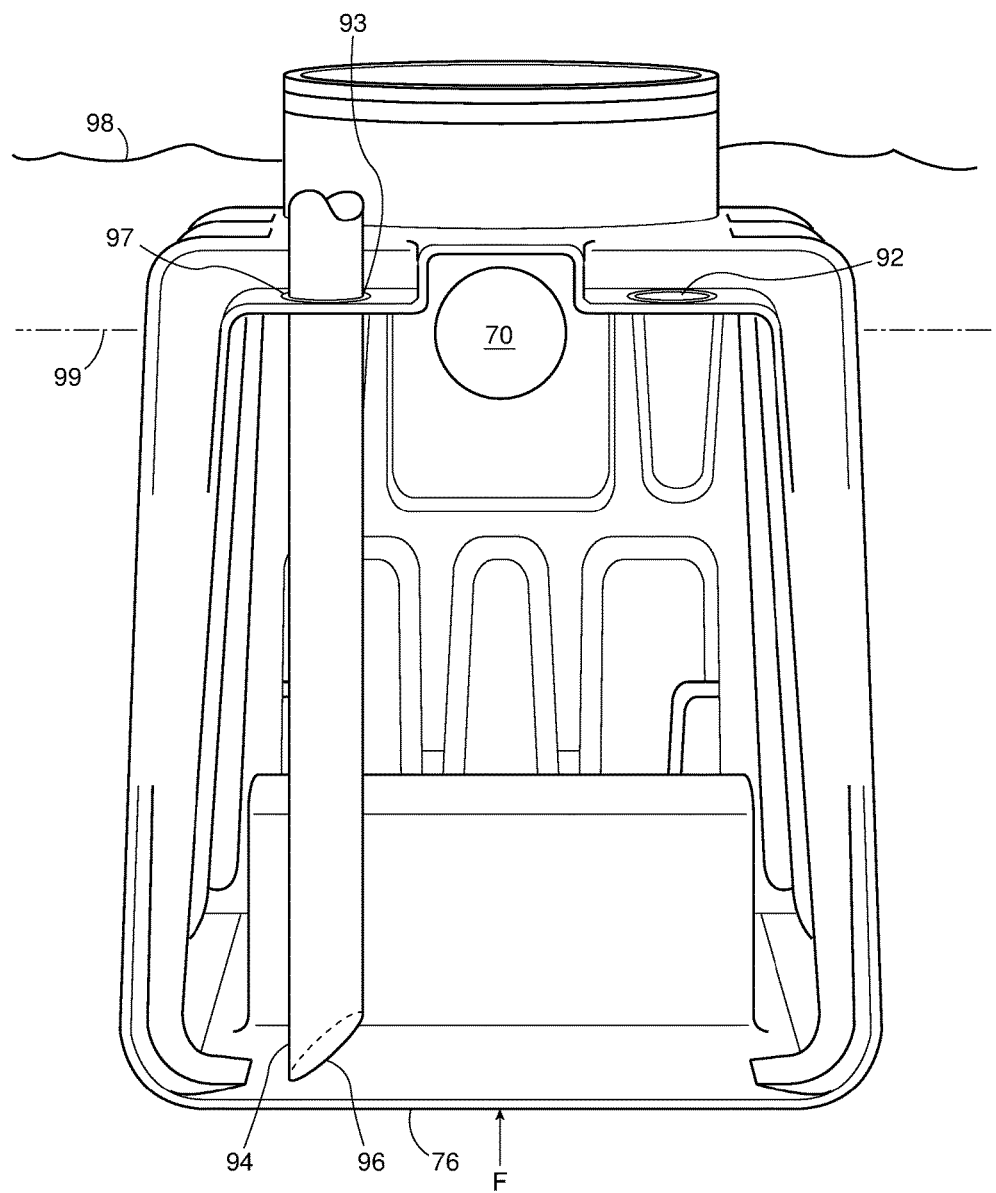
FIG. 7 is an end view of the embodiment of FIG. 6 again showing the positioning of a pump out nozzle.

FIG. 5 is a more complete top view of one embodiment of the vessel 10 according to the present invention. It shows more clearly the alternate outlets 24 and 49 which can be used to connect the vessel to the municipal waste water system. It will be appreciated that when connected the inlet and outlet are positioned in a known manner to allow water to accumulate within the vessel to facilitate the separation of solids and fats oil and grease. As such the position of the inlet and the outlet define an operating water level within the vessel. Depending upon the flow rates in theory the water level cannot get higher, because it will drain out of the vessel through the outlet. The air balancing channel 90 is also shown in FIG. 5 as well as the alternate pump out ports 92 and 93, intended to offer remote pumping capability by vacuum extraction. Most preferably the pump out ports are integrally produced to define cut out details, that when opened for installation receive an annular rubber seal through which a transitional pipe can be inserted for the purpose of allowing direct vacuum extraction of the tank contents. The annular rubber seals can be installed at the factory or in the field to suit local conditions. The pump out ports are most preferably located to make the collection area accessible through the ports, and according to a preferred embodiment at least one may be located directly above the solids collection area where the bottom surfaces converge at a low point so as to facilitate full evacuation of contents without removing the main riser covers. Thus it is preferred to position the pump out detail directly above the location where the floor pan slope directs the solids to accumulate. As noted there are preferably two such pump out ports provided, in the preferred embodiment although one or more would also provide adequate results. FIGS. 6A and 7 show the length of for example, Schedule 40 DWV pipe introduced via the identified drill-out detail to facilitate remote pump out of accumulated contents without removal of the access cover 40. The vertical pump out line 94 added during installation has a 45 degree angle on its end 96 to allow it to suck up waste solids which have accumulated in the solids collection area without becoming blocked by static solids where significant volume is retained. This line is operationally extended to a remote connection or port to which vacuum suction is applied facilitating removal of the vessel contents. Of course as will be understood by those skilled in the art as waste material is removed from the vessel being drawn from the lowest extent then the vessel 10 can be completely evacuated under vacuum/suction. The waste removal will occur from the bottom up, so first the solids will be removed, then the water under the floating FOG layer will be removed and then finally the FOG layer will settle down into the floor pan where it can also be sucked out of the vessel. It will now be appreciated that the sloped floor pan will help to direct the waste material to be removed from the vessel into the central waste removal area located directly below the pump out port and then out through the pump out wand. The soil level is at 98, and the static water level is at 99.

Having described the features of the present invention its operation can now be understood. The first part is to locate the vessel in a suitable location, most preferably outside of the building footprint for ease of access for servicing. The waste water outflow line to the sewer system needs to be located and a suitable excavation made for positioning the vessel within the ground in a position suitable for hydraulically tying into this waste water pipe. Due to the typical fall or slope of a waste water conduit, the further the vessel is located from the building, likely the deeper it will have to be buried. In most cases it will be preferable to position the top of the vessel to be accessible from above the ground to permit the access cover(s) to be easily removed and refitted, so in most cases the vessel will be located relatively close to the building and just below grade. Of course being a plastic molded vessel means that it cannot bear significant loads without supplementary installation safety features. Therefore it should not be located underneath a load bearing surface, such as a parking lot or the like, unless additional structural reinforcement is used to prevent the vessel from collapsing under any such transient surface loads.

Once the excavation is made a suitable size, then the vessel can be lifted and lowered into place. Installers are able to use built-in tie points 102 (see FIG. 6) to help secure the vessel in place in the excavation, through the use of soil anchors, rock anchors or the like or additionally for the mechanical handling of the interceptor. Then the pipe connections can be made to the inlet 70 and at least one outlet 24, 48, 49 to ensure that the hydraulic flows will occur as intended through the vessel. Once these are made then specified backfill can be placed around the vessel and the vessel can be buried beneath the soil surface up to a maximum specified depth defined by performance standard CSA B481.0. Some care is required to avoid over compacting the soil as it is placed over the vessel. Once the soil has been replaced then the vessel is ready for normal service with the waste water flowing through the vessel and the solids and FOG being separated in the normal manner.

Periodically as will be understood by those skilled in the art it will be necessary to pump out the interior of the vessel to get rid of the accumulated solids and FOG. The frequency of the servicing will depend upon the nature and the extent of the waste water flows from the food service establishment. To service the vessel it will be necessary to open one or both of the main access covers or make a vacuum connection using one of the pump out ports 92, 93. Suction would be applied by a mobile device or pump out truck which are familiar to those skilled in the art. By removing either access cover a wand can be inserted into the vessel and the pump out commenced. Once the pump out is completed the cover can be replaced and the pumped out material can be transported for disposal at a managed waste transfer location or the like.

Once the pump out is complete, the vessel will be totally empty, meaning that if the water table sits above the level of the bottom of the vessel as shown in FIG. 7, there will be a buoyancy force F created as the vessel will want to float up within the ground water 99. The vessel may remain substantially empty for a period of a few hours as the operator may wish to further service the unit by washing the interior through an access hatch for example to fully clean it out. Further once it is back in operation it could take some time for the vessel to fill up again to the point where the clarified water once again spills out to the sanitary sewer system, although refilling is instructed as part of the standard maintenance practice. Any vertical buoyancy force F created by a high water table and an empty vessel will be resisted by the shape of the vessel 10 as explained above including both its generally wedge shape body and the use of reinforcing ribs and off-setting indentations which capture the soil within them. As well, the present invention may use tie independently specified restraint locations 102 for soil or rock anchors.

Once the vessel has been cleaned out, then the water flow can be recommenced and the vessel filled up. Again the soil will help in resisting the outward bowing force on the walls of the vessel by reason of the vessel being full of waste water being separated. Thus the present invention takes advantage of the supporting forces generated by the surrounding soil in both conditions of the vessel 10 being full of waste water and the vessel 10 being empty of waste water during servicing.

The present invention therefore provides a simple and easy to use large sized waste water separator which can be buried. By being made from plastic the present invention avoids the perils of using metal based products in a wet environment, such as a sub grade application which can cause extreme corrosion in the worst cases. The present invention can be made of different sizes to accommodate different flow through volumes and can even with one volume of vessel accommodate different flow though rates. The typical rates supported by performance standards are up to 100 gallons per minute although other flow rates can also be accommodated.

It will be appreciated by those skilled in the art that various modifications and variations are possible within the broad scope of the claims which define the exclusive scope of the monopoly and are attached. Some of these variations have been described above and others will be apparent to those skilled in the art. For example the body of the vessel may be shaped to use the weight of the surrounding soil to resist buoyancy forces arising from at least part of the vessel being submerged below the water table and the vessel being emptied during servicing.

We claim:

1. A waste water separation vessel comprising:
    a wedge shaped body having a top wall, side walls and end walls extending down from the top wall and a bottom connected to said side walls and end walls to define an internal water containing volume, said body being formed to contain FOG and wastes, from said waste water, but to allow water, from said waste water, to pass through said body,
    an inlet on said body to permit said waste water to flow into said body,
    an outlet on said body to permit water, from said waste water, to flow out of said body, and
    at least one top facing access port to allow access to said internal volume of said body, wherein said wedge shaped body tapers outwardly from the top to the bottom to define a larger bottom area than a top area, and said side walls include vertically oriented strengthening ribs which define intervening indentations, and a lower end of said vertically oriented ribs is connected to a generally horizontal beam which defines closed bottom ends on said indentations, wherein when said vessel is buried in the ground, said wedge shaped body and said closed bottom indentations interact with said ground to help oppose any buoyancy forces acting on said buried body.

2. The vessel of claim 1 wherein said vertically oriented ribs taper upwardly from a wider base to a narrower top to help oppose buoyancy forces acting on said buried body.

3. The vessel of claim 1 wherein said horizontal beam is not continuous along a bottom edge of said body.

4. The vessel of claim 1 wherein said ribs and said horizontal beam are formed with arched outer profiles for strength against lateral pressure.

5. The vessel of claim 4 wherein said lateral pressure is lateral soil pressure.

6. The vessel of claim 4 wherein said lateral pressure is lateral water pressure.

7. The vessel of claim 1 wherein said top includes at least one pump out opening to provide access to the interior of said vessel for a vacuum source.

8. The vessel of claim 7 wherein said at least one pump out opening includes a removable closure.

9. The vessel of claim 8 wherein said removable closure is sized and shaped to seal against an insertable and removable pump out line used to remove any accumulated contents within said vessel by means of negative pressure.

10. The vessel of claim 8 wherein said at least one pump out opening is positioned above a low point in said bottom to facilitate pumping out said vessel.

11. The vessel of claim 1 wherein said top includes at least one maintenance opening with a removable closure.

12. The vessel of claim 1 wherein said top includes two or more access openings having removable covers and through which inspection, maintenance and pumping activities can be performed upon the covers being removed.

13. The vessel of claim 1 wherein said body is formed from thermoplastic material.

14. The vessel of claim 13 wherein said body is molded using the application of heat and applied force within a controlled environment, to create a primary vessel formed as a single part.

15. The vessel of claim 1 wherein said bottom includes sloped portions to facilitate separation of waste from said waste water.

16. The vessel of claim 15 wherein said bottom slopes towards a center of said bottom to facilitate waste collection and removal.

17. The vessel of claim 1 wherein said body includes tie down elements formed into said body to allow mechanical restraint tie downs to attach to said body to further help oppose buoyancy forces acting on said body.

18. The vessel of claim 1 further includes an air balancing channel located above an operating fluid level within said body.

19. The vessel of claim 1 further including an inclined ramp molded into said bottom to direct the flow of said waste water diagonally across said body in a manner to facilitate separation of FOG from said waste water.

20. The vessel of claim 1 further including at least one riser extension attachable to said access port and which may be trimmed to a desired height to permit said vessel to be buried at different depths, but still to be accessible through said access riser extension.

21. The vessel of claim 1 further including attachment features for internal baffling to permit said vessel to separate solids and FOG from said waste water so said solids and FOG can be contained and then removed from said vessel.

22. The vessel of claim 1 wherein said body includes at least one internal baffle to manage and direct the flow of said waste water into the vessel and said internal baffle further defines a secondary influent flow path within said vessel in the event a primary inflow flow path becomes obstructed.

23. The vessel of claim 22 wherein said secondary influent path is at least partially defined by reinforcing ribs formed in an outer surface of an end of said vessel.

24. The vessel of claim 1 wherein said body incorporates an enclosed well formed into a bottom of said body to facilitate the discharge of said water through said outlet.

25. The vessel of claim 24 wherein said enclosed well includes a component which provides for a discharge water flow rate which is at least equal to a maximum rated flow of the vessel.

26. The vessel of claim 1 further comprising means to separate at least one of FOG and wastes from said waste water.

27. The vessel of claim 26 wherein said means to separate includes sloped portions on said bottom to facilitate separation of waste from said waste water.

28. The vessel of claim 26 wherein said means to separate includes an inclined ramp molded into said bottom to direct the flow of said waste water diagonally across said body in a manner to facilitate separation of FOG from said waste water.

29. The vessel of claim 26 wherein said means to separate includes attachment features for internal baffling to permit said vessel to separate solids and FOG from said waste water so said solids and FOG can be contained and then removed from said vessel.

* * * * *